United States Patent
Gilliland

(10) Patent No.: US 7,221,235 B2
(45) Date of Patent: May 22, 2007

(54) VARIABLE RELUCTANCE FERRITE CORE

(75) Inventor: Don Alan Gilliland, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 11/106,005

(22) Filed: Apr. 14, 2005

(65) Prior Publication Data

US 2006/0232354 A1    Oct. 19, 2006

(51) Int. Cl.
*H04B 3/28* (2006.01)
*H01F 27/02* (2006.01)
*H01F 27/24* (2006.01)

(52) U.S. Cl. .............. 333/12; 336/83; 336/92; 336/175; 336/212

(58) Field of Classification Search .......... 333/12, 333/185
See application file for complete search history.

(56) References Cited

U.S. PATENT DOCUMENTS

| | | | |
|---|---|---|---|
| 3,467,930 A | * | 9/1969 | Glover .................. 336/83 |
| 3,609,615 A | * | 9/1971 | Parker et al. ............. 336/178 |
| 4,167,719 A | * | 9/1979 | Forge ..................... 336/77 |
| 5,977,854 A | * | 11/1999 | Mihara et al. ............. 336/92 |
| 6,252,313 B1 | | 6/2001 | Zhang et al. |
| 6,479,886 B1 | | 11/2002 | Pollock et al. |

* cited by examiner

*Primary Examiner*—Robert Pascal
*Assistant Examiner*—Kimberly E Glenn
(74) *Attorney, Agent, or Firm*—Dillon & Yudell LLP

(57) ABSTRACT

A device, system, and method for suppressing electromagnetic interference (EMI). In one embodiment, an EMI suppression device includes a compound ferrite core having an inner ferrite core and an outer ferrite core. The inner core includes a through hole in which a conductor may be mounted, and the outer core includes a hole in which said inner core is mounted in a concentrically offset manner. The outer core is rotatably adjustable with respect to the inner core in a manner such that the ferrite circuit cross-section area may be varied. The magnetic reluctance of the compound core is controlled in accordance with EMI suppression requirements by adjusting the circuit cross-section area.

14 Claims, 4 Drawing Sheets

VARIABLE RELUCTANCE FERRITE CORE

BACKGROUND OF THE INVENTION

1. Technical Field

The present invention relates generally to noise suppression devices and systems and, in particular, to in-line modules for attenuating electromagnetic interference transmitted to or from electrical and electronic circuits.

2. Description of the Related Art

Electronic systems such as power supplies and computers often radiate and conduct electromagnetic noise at various frequencies. Such emissions cause undesirable electromagnetic interference (EMI) that negatively impacts the host circuitry as well other electronic equipment in spatial or electrical proximity to the system.

The dramatic proliferation of electronic processing devices, such as personal computers (PCs), has resulted in printed circuit board (PCB) designers being faced with increasingly strict electromagnetic compatibility (EMC) regulations. For example, the Federal Communications Commission (FCC) has enacted the so-called "open chassis" EMI regulations that strictly limit the electromagnetic emissions that subject devices may generate. The open chassis criteria generally transfer responsibility to the manufacturer for the regulation of radiation generated by on-board components, such as integrated circuits (IC) modules, from a shielded enclosure (e.g., a computer chassis or enclosure) housing the components to the housed components themselves, such as a PC motherboard. Such emissions, which would otherwise be sufficiently attenuated by the shielded enclosure to satisfy the prior "closed chassis" regulations, must now be sufficiently attenuated independently of enclosure shielding. Satisfying the open chassis regulations enables radiating devices, such as motherboards, to be more flexibly distributed independent of a particular shielded enclosure.

The FCC's open chassis regulations are specified in Table 1 below.

TABLE 1

| Field Strength Limits for Unintentional Radiators at a Distance of 3 Meters | |
|---|---|
| Frequency of Emission (MHz) | Field Strength (microvolts/meter) |
| 30–88 | 100 |
| 88–216 | 150 |
| 216–960 | 200 |
| >960 | 500 |

Given the tendency of EMI to generate undesired high-frequency current loops in the motherboard of a computing system and in view of the foregoing regulations, EMI is a major limitation on increasing processing speed.

So-called common-mode current is the primary source of EMI in many electronic systems. Common-mode is a current conduction mode in which currents, present in two or more conductors, are flowing in phase and with equal magnitude within each conductor. Common-mode current is the component of signal current that induces electric and magnetic fields that do not tend to cancel each other. For example, in a circuit with one outgoing signal conductor and one return "ground" conductor, the common mode current is the component of total signal current that flows in the same direction in both conductors.

Efforts undertaken to address the growing problems and limitations associated with common-mode EMI in electronic systems include meticulous layout of traces in PCBs, decoupling capacitors, and multiple-layer PCBs. Each of these techniques suffers one or more drawbacks in terms of PCB board space economy, high frequency limitations, and cost and complexity. While chassis shielding has long served as a primary EMI attenuation technique, and as explained above, current FCC regulations in combination with the desire for manufacturing flexibility, necessitate additional EMI control independent of that provided by chassis shielding.

In addition to the foregoing shielding and decoupling techniques, common-mode EMI may be suppressed using a ferrite device, often referred to a common-mode choke. Ferrites are utilized as an inexpensive supplement or alternative to suppress common-mode EMI in the electronic industries. A ferrite is generally a type of ceramic material often comprising divalent metals having unique molecular properties that generate high magnetic flux density in the presence of a magnetic field. Ferrites are typically axially mounted around signal path media such as pins or wires. Ferrite beads, cores, or other dissipating elements function by selectively absorbing electromagnetic energy at EMI frequencies. More specifically, a ferrite device absorbs reactive power in its magnetic field, which induces a voltage that opposes the interference signal current flow (typically single direction common mode interference current). Simply put, the common-mode interference signal is trapped in the electrical and magnetic fields of the ferrite and is dissipated as heat.

While effective for suppressing EMI in a variety of electronic systems, there remain problems with conventional design and deployment of such devices. One problem relates to the need for deploying such a device, such as a ferrite bead or toroid, onto a wire that is pre-connected at its ends. To address this problem, split or bisected ferrite devices are commonly utilized to permit installation on pre-connected cables. However, given the very tight geometric tolerances affecting ferrite performance, bisecting the ferrites increases the likelihood of slight geometric anomalies that may adversely affect EMI suppression performance.

Another significant problem associated with conventional ferrite design and deployment relates to the relative lack of tunability for a given application. A common expression of a ferrite's performance is in terms of permeability ($\mu$). Permeability is the ratio of the magnitude of magnetic induction to magnetizing force and is variable as a function of frequency. The performance of a ferrite may be customized by adding metal oxides in various amounts to adjust the permeability and impart attenuation characteristics suited for a specified EMI suppression application. Therefore, setting of ferrite performance for a particular application requires relatively precise pre-estimation of the expected EMI environment. Given the dynamic nature of electronic system environments in which varying operating conditions and system wear may result in significant variations in the EMI environment, and in which environmental conditions such as temperature affect ferrite performance, conventional ferrites are often not optimally tuned for a given environment.

It can therefore be appreciated that a need exists for an improved device, system and method that addresses the foregoing problems. The present invention addresses these as well as other problems unaddressed by the prior art.

SUMMARY OF THE INVENTION

A device, apparatus, and method for suppressing electromagnetic interference (EMI) are disclosed herein. In one embodiment, an EMI suppression device includes a compound ferrite core having an inner ferrite core and an outer ferrite core. The inner core includes a through hole in which a conductor may be mounted, and the outer core includes a hole in which said inner core is mounted in a concentrically offset manner. The outer core is rotatably adjustable with respect to the inner core in a manner such that the ferrite circuit cross-section area may be varied. The magnetic reluctance of the compound core is controlled in accordance with EMI suppression requirements by adjusting the circuit cross-section area.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
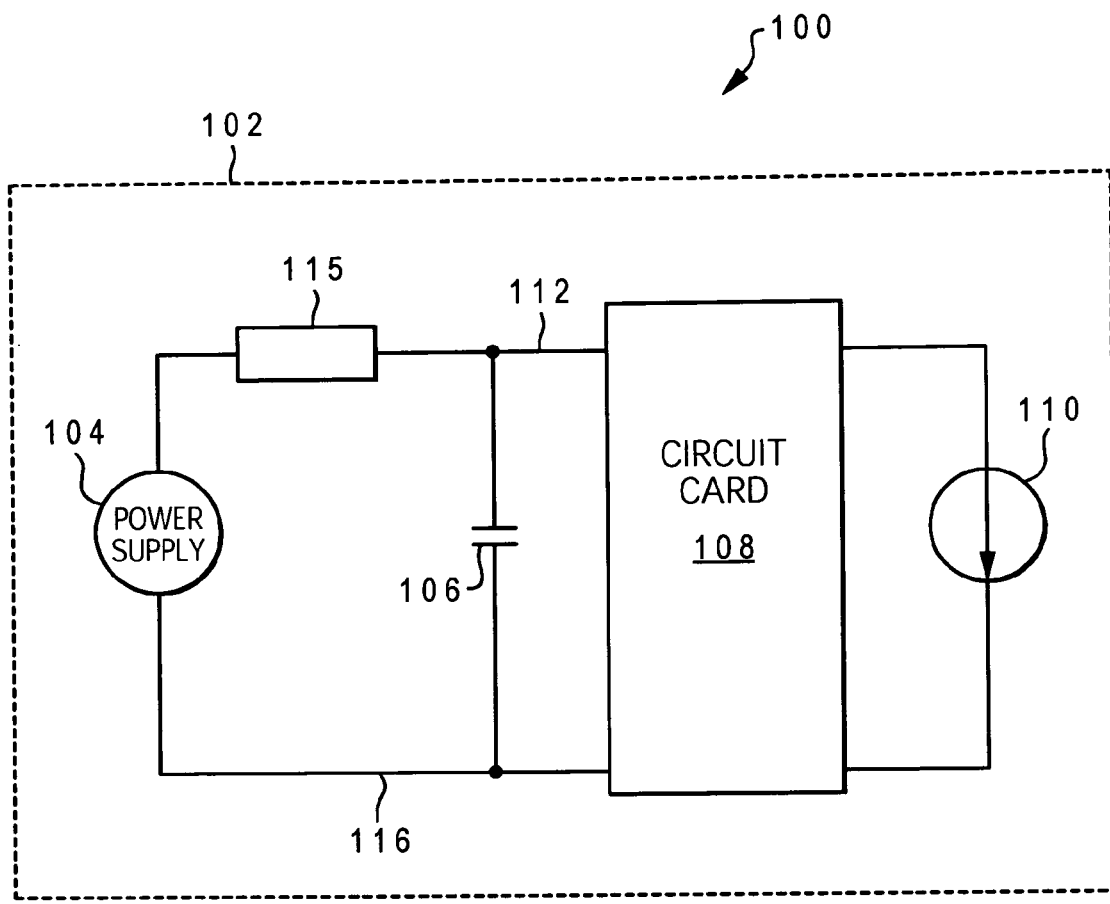
FIG. 1 is a simplified schematic diagram of an electronic system having an EMI suppression device disposed along the power supply path of a circuit card in accordance with one embodiment of the present invention.

Referring now to the figures, wherein like reference numerals refer to like and corresponding parts throughout, and in particular with reference to FIG. 1, there is illustrated an electronic system 100 adapted for reducing normal mode electromagnetic interference (EMI) in accordance with one embodiment of the present invention. Electronic system 100 generally comprises a circuit card 108, a power supply 104, and a decoupling capacitor 106, all of which are disposed within a metal chassis structure 102. Circuit card 108, which may be, for example, a microprocessor card, includes circuit devices and modules (not depicted) having a current load schematically represented by block 110. Power supply 104 supplies power to circuit card 108 over a power supply path 112 and a ground or return path 116. Decoupling capacitor 106 is coupled between power supply path 112 and return path 116, providing a level of attenuation of high-frequency EMI leakage from circuit card 108 to a PCB such as a motherboard (not shown). Metal chassis 102 is generally a metal enclosure that houses the components and integrated modules of electronic system 100 to providing additional protection against the emission of EMI generated by electronic system 100.

Figure 3A:
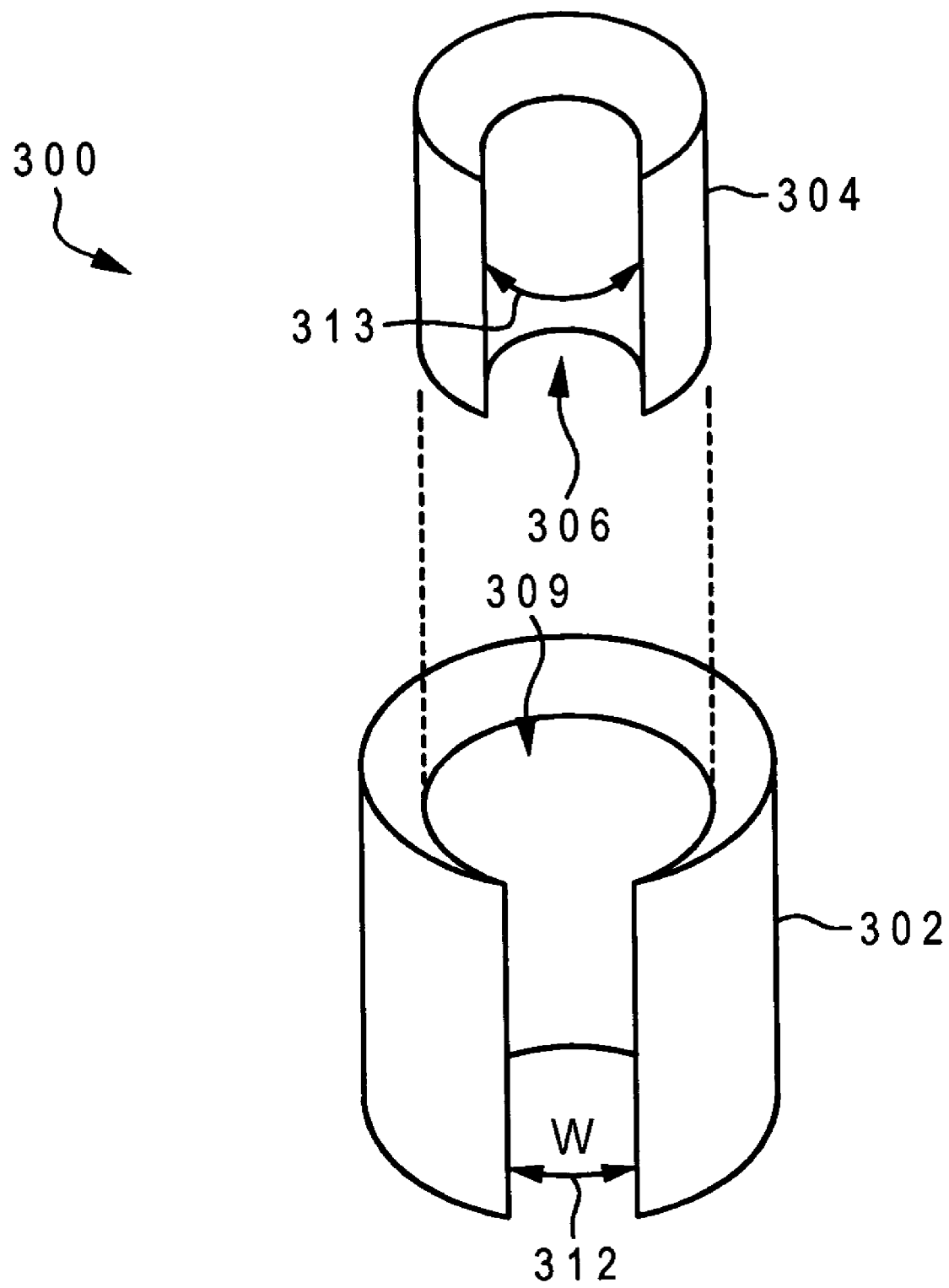
FIGS. 3A–3D illustrate various views of an EMI suppression device in accordance with a preferred embodiment of the present invention.
Figure 3B:
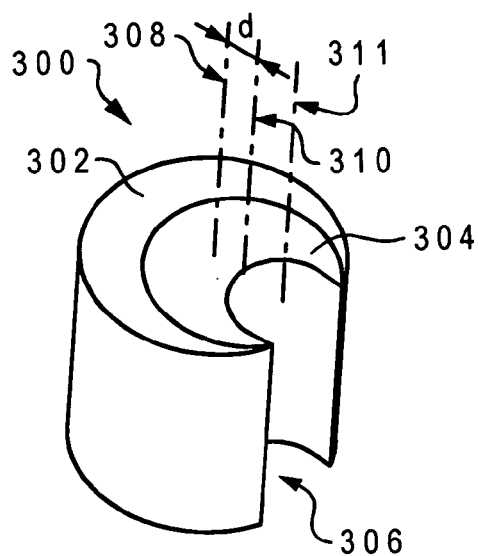
Figure 3D:
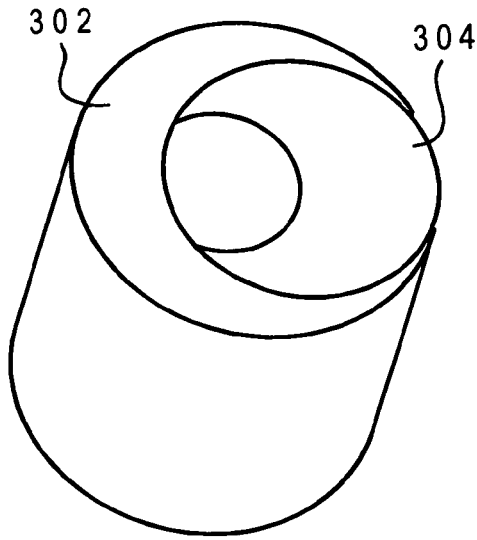
Figure 3C:
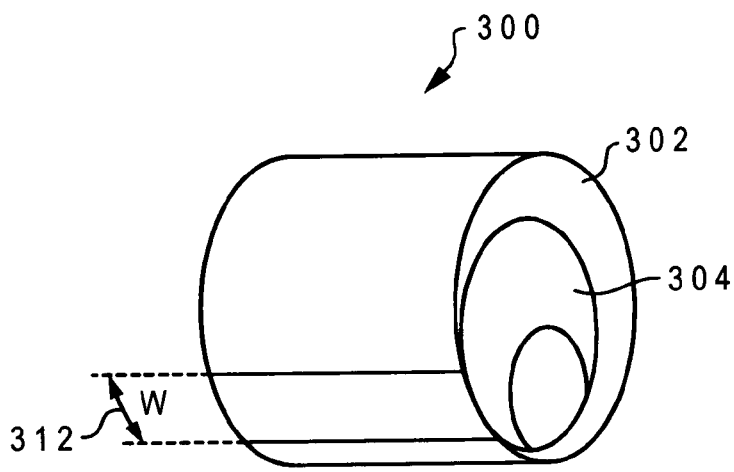
Figure 4:
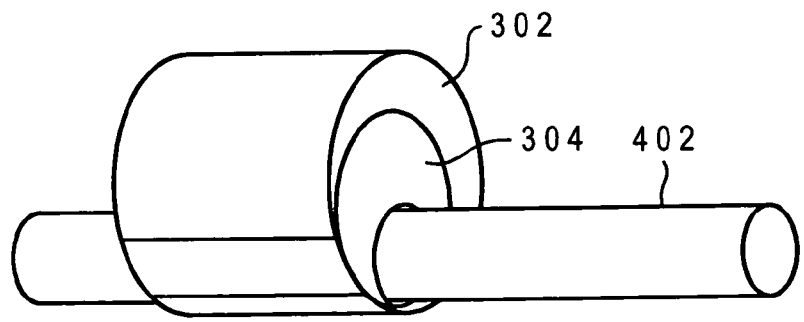
FIG. 4 depicts an EMI suppression device mounted onto a cable conductor in accordance with the present invention.

In accordance with the depicted embodiment, an EMI suppression device 115, such the device depicted and described below in further detail with reference to FIGS. 3, 4, and 5, is coupled in series with power supply path 112 in a manner such that high-frequency EMI emissions from circuit card 108 are minimized. While not shown in FIG. 1, electromagnetic shielding may be deployed cooperatively with EMI suppression device 115 to provide enhanced EMI attenuation. In one such configuration, EMI suppression device 115 is coupled to an electromagnetic shield (not depicted) surrounding circuit card 108 and would thus add impedance preferably at the shield's resonant frequencies to suppress common-mode noise. By containing the high-frequency EMI in this fashion, the circuitry on circuit card 108 can operate at higher speeds without interfering with the frequency spectrum reserved for radio communications. Assuming electronic system 100 is a computing system, the processing power of the system in terms of speed may therefore be increased to improve its operational efficiency and marketability. Moreover, those skilled in the art will appreciate that EMI suppression device 115 may alternately be advantageously incorporated into a circuit card cartridge (not shown) designed to enclose circuit card 108 while disposed on a multi-cartridge backplane. In so doing, the problem of unwanted EMI may be solved without modifying the extant PCB or backplane architecture, thereby reducing the cost of implementing an adequate level of EMC.

EMI suppression device 115 suppresses leakage of high-frequency current from circuit card 108 that may occur along power supply path 112. Such high-frequency current leakage may occur along power supply path 112 due to resonance formed between the board capacitance of circuit card 108 and the inductive and resistive parasitic elements of decoupling capacitor 106. At the resonant frequencies, the high-frequency current may readily leak to the circuit card, resulting in a large current loop on the card, which in turn, increases the likelihood of emitting unwanted high-frequency EMI from electronic system 100.

EMI suppression device 115 countervails this resonance effect by forming a high impedance path along the power supply path 112 at the higher EMI frequencies. Attenuating the high-frequency current leakage in this fashion effectively minimizes the amplitude of the current flowing on circuit card 108, thus minimizing EMI emitted from electronic system 100.

In accordance with the embodiment depicted in FIG. 1, EMI suppression device 115 is deployed in a normal-mode EMI suppression configuration. Other possible normal-mode configurations may include deployment of similar EMI suppression devices on or in association with packaged integrated circuits (ICs) or other electronic components.

Figure 2:
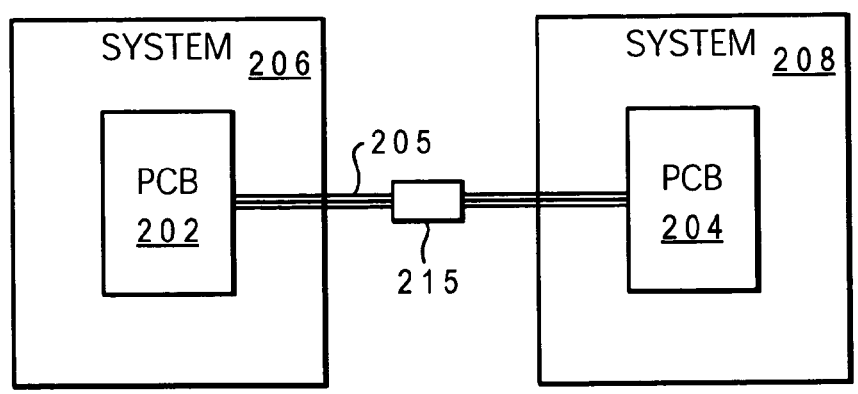
FIG. 2 is a block diagram depicting an EMI suppression device deployed in a common-mode EMI suppression configuration in accordance with a preferred embodiment of the present invention.

FIG. 1 depicts an embodiment in which an EMI suppression device is deployed in a normal-mode EMI suppression configuration. In a preferred embodiment, the EMI suppression device of the present invention is utilized to suppress common-mode EMI that occurs, for example, on multi-conductor cables interconnecting circuit boards and external cabling. Referring to FIG. 2, there is illustrated a block diagram depicting an EMI suppression device 215 deployed in a common-mode EMI suppression configuration in accordance with a preferred embodiment of the present invention. In accordance with the embodiment shown in FIG. 2, a first electronic system 206 includes a PCB 202 that is electronically and/or communicatively coupled to a PCB 204 mounted within a second electronic system 208 via external cabling 205. EMI suppression device 215 is coupled in an in-line manner over an external cable 205 comprising multiple signal lines to suppress common-mode resonant frequencies originating from either or both of PCBs 202 and 204.

The design and implementation of an EMI suppression device, such as EMI suppression device 115 or 215, are now depicted and described in further detail with reference to FIGS. 3, 4, and 5. As described below, the EMI suppression device of the present invention is a compound ferrite core device enabling coupling of the device to pre-connected wires, cables, pins, etc., while dispensing with the traditional split or bisected design utilized in many ferrites. Generally, a concentric, dual lumen design is employed in which concentric circular cores are mutually rotatably adjustable. The outer concentric core includes an axially offset through hole or bore in which the inner core is disposed in an off-centered concentric manner. The inner concentric core includes an axially offset through hole or bore through which a cable, wire, line (collectively referred to herein as a "conductor" for simplicity of reference) may be mounted.

With reference to FIGS. 3A–3D, there are illustrated various views of an EMI suppression device 300 in accordance with a preferred embodiment of the present invention. As shown in FIGS. 3A–3D, EMI suppression device 300 generally comprises an inner core 304 concentrically disposed in an axially off-centered manner within an outer core 302. The cores preferably comprise a ferromagnetic material that can be magnetized to produce large magnetic flux densities in response to small applied magnetization forces. Ferrites are a commonly used type of ferromagnetic suppression device. Sometimes referred to as "magnetic insulators," ferrites are mounted on PCBs, wires, cables, etc., in a vast array of electronic and electrical systems and devices for common-mode EMI suppression. In a preferred embodiment of the present invention, inner core 304 and outer core 302 are ferrite cores.

Inner core 304 has a generally circular outer contour and is disposed within a conformingly contoured though hole or bore 309 within outer core 302. Inner core 304 includes a through hole or bore 306 in which a conductor or conductor carrying cable (referred to collectively as a "conductor") may be mounted (see FIG. 4). As shown in FIG. 3B, the inner core axial center 310, coinciding with the center of outer core through hole 309, is offset by a distance, d, from the outer core axial center 308. Similarly, the axial center 311 of inner core through hole 306 is offset from the inner core axial center 310. In this manner, and as depicted in the each of the figures, the inner and outer cores 304 and 302 are each characterized as having crescent-like lobes diametrically opposed by open slots or perforations 313 and 312, respectively.

The axially off-centered disposition of inner core 304 within outer core 302 provides a multifaceted benefit in the design and deployment of EMI suppression device 300. Namely, the aforementioned lobed and mutually rotatable configuration of the cores 304 and 302 enables variable reluctance tuning of the compound core by adjusting the effective ferrite circuit cross-section area. Furthermore, the design depicted in FIGS. 3–5 improves upon conventional bisected ferrite design conventionally available for mounting onto pre-connected lines such as drop cables in which the two halves of the ferrite are mounted with clips that clamp over the cable.

As shown in the figures, outer core though hole 309 perforates outer core 302 longitudinally, resulting in a longitudinal open slot or perforation 312 having a width, W, sufficient for accepting a cable 402 while being sufficiently narrow to securely retain inner core 304. Similarly, inner core through hole 306 perforates inner core 304 longitudinally such that conductor 402 can be inserted in the inner core through hole 306 through the longitudinal inner and outer core hole perforations 313 and 312 when perforations 313 and 312 are radially aligned. FIG. 3B depicts the compound core of EMI suppression device 300 positioned in the "open" position for receiving a pre-connected cable or other conductor. As shown in FIG. 3B, the open position is achieved by rotating outer core 302 with respect to inner core 304 such that the longitudinal perforations 313 and 312 of inner and outer cores 304 and 302, respectively, are radially aligned.

The present invention further addresses the relative lack of control, when using conventional EMI suppression devices, of performance metrics such as magnetic reluctance that may require adjustment over changing environmental and/or circuit conditions. For conventional ferrites, deformation of the suppression device caused by bending and/or expansion of the cable results in alteration of the air gap between the shielded cable and the suppression device.

As is well known in the art, a key performance parameter for a ferrite EMI suppression device relates to the co-dependent parameters of magnetic reluctance and magnetic permeability. Magnetic reluctance is generally the resistance of a material to a magnetic field and may be more specifically defined as the magnetic circuit property that determines the relationship between magnetic flux and corresponding magnetomotive force (mmf). The reluctance R of a uniform magnetic circuit can be calculated as:

$$R = l/(\mu A)$$

where R is the reluctance, measured in ampere-turns per weber, l is the length of the circuit, measured in meters, $\mu$ is the magnetic permeability of the material, measured in henry per meter (H·m$^{-1}$), and A is the cross-sectional area of the circuit in square meters. As explained in further detail below with reference to FIGS. 5A–5D, the magnetic reluctance of the device is controlled by adjusting the cross-sectional area A of the ferrite circuit.

As is well known in the art, the permeability and reluctance and therefore the inductance of a ferrite device is affected by the air gap between the outer surface of the cable and the inner surface of the ferrite. Namely, if an air gap is introduced into the magnetic path of a ferrite core, the reluctance is increased, resulting in a decreased inductance. To minimize the effects consequent to air gap irregularities, conventional ferrites, such as ferrite beads and toroids, must be selected to have an inner diameter closely matching the outer diameter of the cable carried therein. When an air gap is desired, to improve the core's capacity for dc ampere-turn performance for example, conventional cores must be irreversibly ground or shimmed to obtain a desired air gap in the one of the halves of a bisected core.

For conventional ferrite cores, the permeability and hence the reluctance of the device is statically determined as a design and manufacturing metric in accordance with the relative quantity and ratio of the various constituent elements, such as various metal oxides, used to make the devices. However, dynamic and sometimes unpredictable environmental conditions make it difficult to accurately determine an optimal reluctance value. Furthermore, the reluctance and hence the permeability of the core can be dramatically altered by a change in air gap resulting, for example, from bending or expansion of the cable. For example, when a cable expands or is bent at or near a conventional bisected ferrite device, the air gap between the outer surface of the cable and the inner surface of the ferrite expands.

The compound core design of the presently disclosed EMI suppression device addresses the foregoing problems by providing variable reluctance tunability unavailable in conventional ferrite suppression devices. Furthermore, the compound annular core design eliminates problems relating to air gap expansion when a cable expands or is bent at or near the device. Referring to FIGS. 3B–3D, the rotatable adjustability of EMI suppression device 300 is depicted. As explained above, FIG. 3B illustrates EMI suppression device 300 in the "open" position in which the open, longitudinal perforations 313 and 312 of cores, 304 and 302, respectively are radially aligned. In this position, the open (i.e infinite) air gap results in device 300 having a substantially infinite reluctance and hence a near zero permeability. The ferrite circuit cross-section area is generally the area occupied by the ferrite material and disposed symmetrically within the magnetic field path. FIGS. 3C and 3D depict, respectively, device 300 wherein inner core 304 is progressively rotated with respect to outer core 302 such that the ferrite circuit cross-section area is increased, resulting in a corresponding decrease in the magnetic reluctance of the device.

Figure 5A:
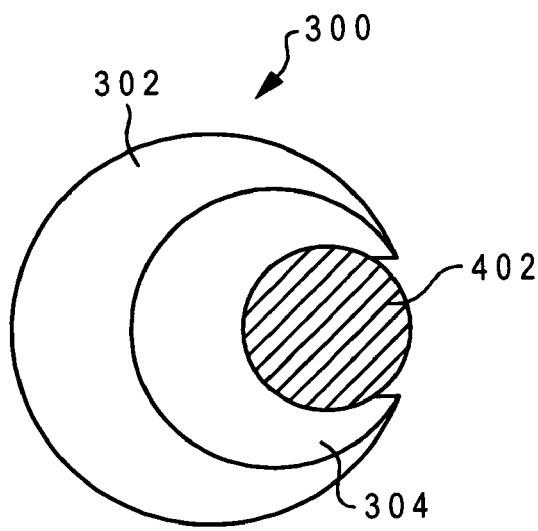
FIGS. 5A–5D depict cross section views of an EMI suppression device in accordance with the present invention.
Figure 5B:
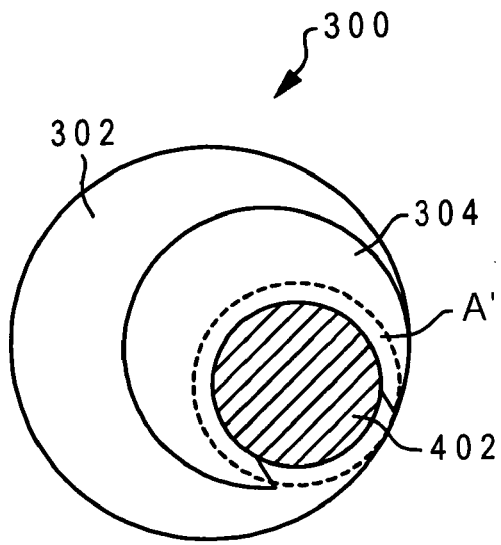

Referring to FIGS. 5A–5D, there are depicted cross-section views of EMI suppression device 300 in accordance with the present invention. Specifically, the cross-section views illustrate the variation of the ferrite circuit area, A, in accordance with relative positioning of the inner and outer cores 304 and 302. The first view, depicted in FIG. 5A, shows inner and outer cores 304 and 302 relatively positioned such that the longitudinal perforations are radially aligned, resulting in a near zero ferrite circuit cross-section area and corresponding infinite magnetic reluctance. Next, as illustrated in FIG. 5B, inner core 304 has been rotated with respect to outer core 302 (or vice versa) such that no open side remains while conductor 402 remains substantially axially non-centered with respect to the outer contour of device 300, resulting in relatively a small ferrite circuit cross-section area, A', and correspondingly relatively high value of magnetic reluctance.

Figure 5C:
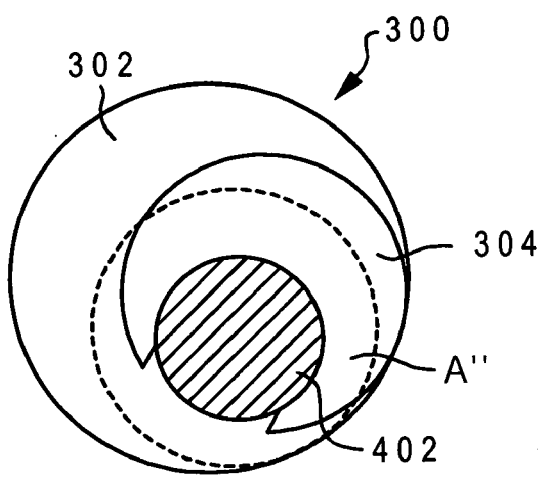
Figure 5D:
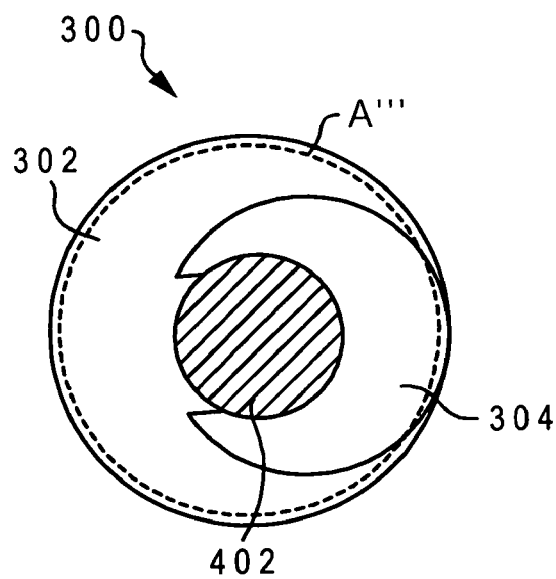

FIG. 5C depicts device 300 with inner core 304 further rotated with respect to outer core 302 such that conductor 402 is more nearly axially centered with respect to the outer contour of device 300, resulting in a larger ferrite circuit cross-section area, A", and correspondingly lower value of reluctance. Finally, FIG. 5D illustrates device 300 with inner core 304 further rotated such that conductor 402 is substantially axially centered with respect to the outer contour of the device. In this position, the symmetric cross-section area, A''', of the ferrite circuit surrounding conductor 402 is maximized resulting in a minimized magnetic reluctance and increased EMI suppression characteristic.

It should be noted that while EMI suppression device 300 has been described as consisting of inner and outer cores made of ferrite materials, other ferromagnetic materials may be utilized within the spirit and scope of the present invention. Ferromagnetic and paramagnetic materials such iron, steel, nickel, etc., individually or in any combination, may be utilized to construct either or both inner and outer cores 304 and 302, particularly when device 300 is deployed in a non-EMC tuning application.

While the invention has been particularly shown and described with reference to a preferred embodiment, it will be understood by those skilled in the art that various changes in form and detail may be made therein without departing from the spirit and scope of the invention.

What is claimed is:

1. An EMI suppression device comprising:
   an inner core having a hole in which a conductor may be mounted; and
   an outer core having a hole in which said inner core is mounted, wherein said outer core is rotatably adjustable with respect to said inner core, and wherein the outer core hole is axially offset with respect to said outer core such that the axial center of said inner core is not axially aligned with the axial center of said outer core.

2. The EMI suppression device of claim 1, wherein said inner core and said outer core comprise ferromagnetic material.

3. The EMI suppression device of claim 1, wherein said inner core and said outer core comprise ferrite cores.

4. The EMI suppression device of claim 1, wherein the outer core hole has a substantially circular contour, said inner core having a substantially circular outer contour conforming to the contour of the outer core hole.

5. The EMI suppression device of claim 1, wherein the outer core hole perforates the outer core longitudinally.

6. The EMI suppression device of claim 5, wherein the inner core hole perforates the inner core longitudinally such that a conductor can be inserted into the inner core hole through the longitudinal inner and outer core hole perforations when the longitudinal inner and outer core hole perforations are radially aligned.

7. A method for deploying and tuning an EMI suppression device that includes an inner core disposed within a hole of a rotatably adjustable outer core, said inner core having a hole in which a conductor may be mounted, wherein the outer core hole is axially offset with respect to the outer core such that the axial center of said inner core is not axially aligned with the axial center of said outer core, said method comprising rotating said outer core with respect to said inner core to achieve a desired level of magnetic reluctance of the EMI suppression device.

8. The method of claim 7, wherein the outer core hole perforates the outer core longitudinally and the inner core hole perforates the inner core longitudinally, and wherein said rotating said outer core with respect to said inner core to achieve a desired level of magnetic reluctance of the EMI suppression device is preceded by rotating said outer core with respect to said inner core until the longitudinal inner and outer core hole perforations are axially aligned such that a conductor can be inserted into the inner core hole through the longitudinal inner and outer core hole perforations.

9. An apparatus for suppressing common-mode electromagnetic interference (EMI), said apparatus comprising:
   a cable coupled to an electronic system; and
   a compound ferrite core comprising:
      an inner core having a hole in which the cable is mounted; and
      an outer core having a hole in which said inner core is mounted, wherein said outer core is rotatably adjustable with respect to said inner core, and wherein the outer core hole is axially offset with respect to said outer core such that the axial center of said inner core is not axially aligned with the axial center of said outer core.

10. The apparatus of claim 9, wherein said inner core and said outer core comprise ferromagnetic material.

11. The apparatus of claim 9, wherein said inner core and said outer core comprise ferrite cores.

12. The apparatus of claim 9, wherein the outer core hole has a substantially circular contour, said inner core having a substantially circular outer contour conforming to the contour of the outer core hole.

13. The apparatus of claim 9, wherein the outer core hole perforates the outer core longitudinally.

14. The apparatus of claim 13, wherein the inner core hole perforates the inner core longitudinally such that the cable may be inserted into the inner core hole through the longitudinal inner and outer core hole perforations when the longitudinal inner and outer core hole perforations are radially aligned.

* * * * *